United States Patent [15] 3,671,869

Wolfram [45] June 20, 1972

[54] TELEVISION CHANNEL INDICATOR COMMON TO VHF AND UHF AND EASILY PROGRAMMABLE TO LOCALLY AVAILABLE CHANNELS

[72] Inventor: Adolf Egmont Wolfram, Portsmouth, Va.

[73] Assignee: General Electric Company

[22] Filed: Feb. 16, 1971

[21] Appl. No.: 115,623

[52] U.S. Cl. ...............................325/455, 315/84.6, 334/86, 334/87, 340/324 R, 340/336, 340/166 EL

[51] Int. Cl. ..........................................................H04b 1/06

[58] Field of Search ...................313/108, 109 S, 110, 169 T; 315/84.6; 325/455, 461, 465; 334/33, 36, 37, 60, 86, 87; 340/324 A, 324 R, 325, 334, 336, 166 EL

[56] References Cited

UNITED STATES PATENTS

| | | | |
|---|---|---|---|
| 3,119,950 | 1/1964 | Somlyody | 315/84.6 |
| 3,244,983 | 4/1966 | Ertman | 325/455 |

*Primary Examiner*—Albert J. Mayer

*Attorney*—F. L. Neuhauser, Oscar B. Waddell, Joseph B. Forman, W. J. Stanley, Stanley C. Corwin, and F. W. Powers

[57] ABSTRACT

A channel indicator for a television receiver for indicating tuning to all channels whether UHF or VHF. Two segmented decimal display devices are provided, one for the units digits and one for the tens digits of channels two to 83. Matrices control each display device. Switches assigned to each channel and associated with a conventional tuning mechanism control the matrices to cause the display devices to display the channel number of the channel to which the receiver is tuned by the tuning mechanism.

14 Claims, 5 Drawing Figures

INVENTOR
ADOLF E. WOLFRAM
BY James E Espe
HIS ATTORNEY

TELEVISION CHANNEL INDICATOR COMMON TO VHF AND UHF AND EASILY PROGRAMMABLE TO LOCALLY AVAILABLE CHANNELS

BACKGROUND OF THE INVENTION

By adding seventy new channels to the twelve previously existing, the advent of UHF television has severely complicated the problem of providing television receivers with satisfactory visual indicators of the channel number of the channel to which the receiver is tuned. Present visual indicator practice has evolved in response to various expendiencies which resulted in the use of different indicator dials for the VHF and UHF channels. The mere presence of two dials and the fact that many channel numbers are actually simultaneously visible on them confuses the user. A system in which only one channel number, that of the channel to which the receiver is tuned, is visible at any one time, and in which there is no separation between UHF and VHF, as with two dials, is much to be preferred. Since only a small number of the total number of VHF and UHF channels established by the U.S. Government are used in any localized geographical area, it is also very desirable that channel indicators be designed so that they may be easily programmed to function only for the channels actually used in any given local area.

Digital display tubes having a number of display elements in a segmented configuration produce a visible display of any one of the decimal numerals 1-2-3-4-5-6-7-8-9-0 are well known in the art. For example, such tubes include anodes with phosphor coatings which may be illuminated by appropriate voltages applied between the anodes and a common cathode. Matrices for operating such display tubes are also well known. In fact, an inexpensive novel matrix for that purpose is disclosed and claimed in my co-pending application Ser. No. 861,067 and filed Sept. 25, 1969 now abandoned and again in this application.

STATEMENT OF THE INVENTION

By combining in a television receiver two of the aforesaid display devices to indicate units and tens digits of all VHF and UHF channels with matrices of the above type and with switch means associated with a television receiver tuning mechanism, an inexpensive channel indicator solving the above problem is obtained. The switch means is such that it may easily be programmed to set the channel indicator only for those channels used in a local area.

DESCRIPTION OF THE DRAWING

FIG. 1 illustrates two decimal display tubes of the type described above positioned side by side as on the front of a television receiver to display channel numbers.

FIG. 2 illustrates two such tubes together with matrices and switch means for operating the tubes in accordance with this invention.

DESCRIPTION OF THE PREFERRED EMBODIMENT

Figures 3, 4, 5:
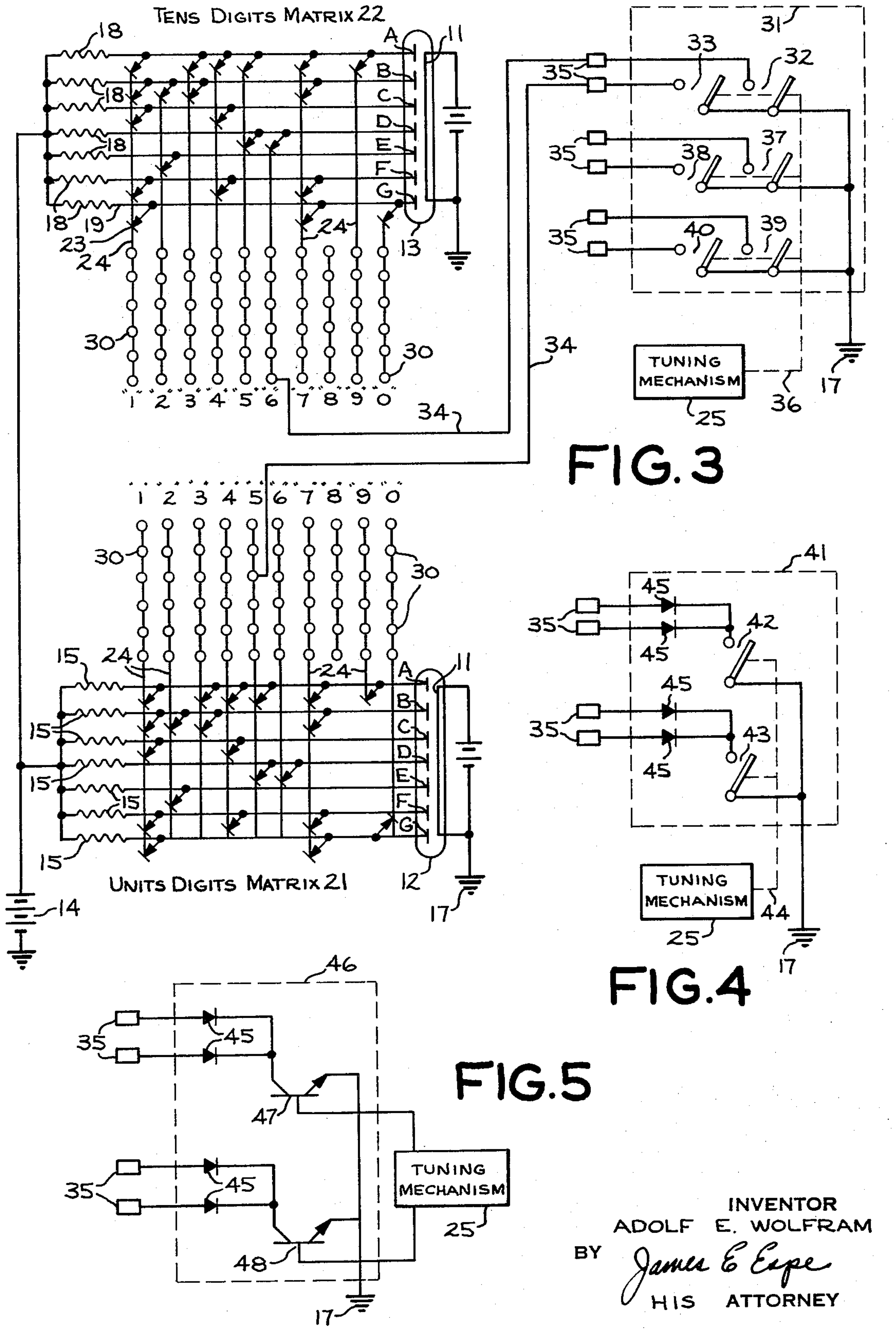
FIG. 3 illustrates an arrangement similar to that of FIG. 2 but of a modified embodiment.
FIG. 4 is a fragmentary schematic diagram showing another embodiment.
FIG. 5 is a fragmentary schematic diagram showing a further embodiment.

Referring to FIG. 1, there are shown two display tubes 12 and 13 of the above type side by side as they might appear on the front face of a television set to display the tens and units digits of any one of the channel numbers two to 83. Each tube is comprised of individual "segmented" phosphorized anodes A - B - C - D - E - F - G electrically separated from each other and arranged in a figure "8" configuration such that any one of the numerals of the decimal digits group "1" - "2" - "3" - "4" - "5" - "6" - "7" - "8" - "9" - "0" may be displayed by energization of selected anodes. For example, energization of the anodes D and E will display the numeral "1", while energization of the anodes A, C, D, F and G will display the numeral "2". Energization selectively of other anodes will display the remaining numerals of the decimal digits group as will be apparent, and even more clear from the description of the FIG. 2 of the drawing. It is understood, of course, that each of the anodes has an associated cathode, or a single cathode 11 may be common to all anodes, and that the application of voltage between the cathode and the anodes will illuminate a phosphor on the anodes in the manner well understood in the art.

In FIG. 2, the two display tubes 12 and 13 are shown schematically but they are physically the same as the display tubes of FIG. 1, tube 12 displaying the units decimal digits and tube 13 displaying the tens decimal digits. A power source 14 is applied to all display anodes A, B, C, D, E, F and G of the units digits display tube 12 through resistors 15 and conductors 16. This has the result that initially the numeral "8" would be displayed by the units display tube 12 by virtue of the connection of the units display tube 12 to ground 17. The same is true of the tens digits display tube 13 in respect to the power source 14, upper right portion of switch array 20, resistors 18, conductors 19, and ground 17, except that as later explained, provision is made to de-energize tens digits tube 13 completely through switch array 20 when only channels two through nine, which have only units digits, are to be displayed.

From this point on, the selection of channel numerals to be displayed in either tube 12 or 13 is controlled by de-energization of selected anodes A, B, C, D, E, F, and G of either tube. This, as will be explained later, is down through the switch array 20. Before explaining array 20, the units decimal digits matrix 21 and tens decimal digits matrix 22 will be explained.

As previously stated, all of the anodes of both tubes 12 and 13 are initially energized by the application of voltage from the power source 14. If any one anode is de-energized by shorting it to ground, that anode will, of course, not display. It will be noticed that both matrices have a plurality of diodes 23 connected on their one side (anodes) to various ones of the anodes of the tubes 12 and 13 through the conductors 16 or 19; and on their other side (cathodes) to conductors 24 which carry the numeral designations "1", "2", "3", "4", "5", "6", "7", "8", "9" and "0" corresponding to the numerals to be displayed selectively by the tubes 12 and 13 when any one conductor 24 is selectively connected to ground to short the corresponding anode of the tubes 12 and 13 through the diodes 23. Thus, if any group of the diodes 23 associated with any one conductor 24, are connected to ground by connecting that conductor 24 to ground 17, that connection will de-energize the display tube anodes to which that group of diodes are connected by short circuit of the display tube anodes to ground. For example, if the diodes 23 associated with the conductor 24 designated by the numeral "1" are connected to ground, only anodes A, B, C, F, G, will be de-energized or short circuited to ground, and thus only the anodes D and E will remain energized to display the numeral "1". If the diodes associated with the conductor 24 designated by the numeral "2" are connected to ground, only the anodes B and E will be de-energized to display the numeral "2", since in that case the anodes A, C, D, F and G will remain energized. Similarly, if the diodes associated with the conductor 24 designated by the numeral "3" are connected to ground, only anodes A and B will be de-energized, and thus the numeral "3" will be displayed since the anodes C, D, E, F and G will remain energized. Similarly, if the diodes associated with the conductor 24 designated by the numeral "4" are connected to ground, only the anodes A, C and F will be de-energized and thus the numeral "4" will be displayed because the anodes B, D. E and G will remain energized. Similarly, if the diodes associated with the conductor 24 designated by the numeral "5" are connected to ground, only the anodes A and D will be de-energized and thus the numeral "5" will be displayed since the anodes B, C, F and G will remain energized. Similarly, if the diodes associated with the conductor 24 designated by the numeral "6" are connected to ground, the numeral "6" will be displayed since only anode D will be de-energized and all other anodes will remain energized. Similarly, if the diodes associated with the conductor 24 designated by the numeral "7" are connected to ground, only the anodes A, B, F and G will be de-energized and thus the numeral "7" will be displayed since the anodes C, D and E will remain energized. As previously indicated if none of the anodes are connected to ground, the numeral "8" will be displayed and therefore there is no diode 23 associated with the numeral "8". Similarly, if the diodes associated with the conductor 24 designated by the numeral "9" are connected to ground, only the anode A will be de-energized and thus numeral "9" will be displayed since all other anodes will remain energized. Similarly, if the diodes associated with the conductor 24 designated by the numeral "0" are connected to ground, only the anode G will be de-energized and thus the numeral "0" will be displayed since all other anodes will remain energized.

Coming now to the switch array 20, this comprises a pair of simultaneously operable single pole double throw switches for each of the VHF channels two to 13 and any six of the 70 UHF channels. All of the 70 UHF channels could be provided with these pairs of switches but that is not desirable because of the complexity of switch array 20 which would be caused thereby and because in any one local geographical area there are on the average far fewer UHF stations in operation. Therefore, to limit the cost and to simplify the equipment only a sufficient number of UHF pairs of switches is provided to meet the demands of the local area having the greatest number of UHF channels in use. For example, for convenience of illustration, the FIG. 2 provides for six UHF channels, which also for convenience of illustration, have been designated arbitrarily as channels 26, 32, 45, 55, 63, and 76. It may be found desirable for factory mass production and market distribution purposes to provide for more or less than six UHF channels in switch array 20, depending on the need of the local areas having the greatest number of UHF channels in use. A similar limitation of the number of switches for the VHF channels two to thirteen could be put into effect, since there are some local areas where not all VHF channels are in use. However, it would probably not be desirable, for practical mass production and market distribution purposes, to omit any of the pairs of switches for the VHF channels two to 13, since most VHF channels are in general use. Pairs of switches for the switch array 20 are designated by the channel designations on the righthand side of the drawing, thus, CH 2 to CH 13, and CH 26, CH 32, CH 45, CH 55, CH 63 and CH 76.

The arms of any one pairs of switches corresponding to any one channel are simultaneously operable, as by the ganging means shown in the dotted lines; they are operable from the position shown in which the arms are on their left hand contacts to the position where the arms on their righthand contacts, and vice versa. If the television receiver is tuned to any given channel, the arms representing that channel will be switched to their righthand contacts, and switched to the left hand contacts when the television receiver is not so tuned. This, of course, can be accomplished by any suitable mechanism as push button switches. The same mechanism can be used to tune the television receiver to the corresponding channel. For example, push button controls might actuate a voltage tuning mechanism. Of course, common rotary switching mechanisms may also be used. The tuning mechanism is shown schematically as 25. It operates in a ganged fashion with the switches of the switch array 20 and tunes the receiver to the channel corresponding to the channel number of any selected pair of switches which has been operated.

Note that the righthand contacts of all switches on the left side of each pair of all channels CH 2 to CH 76, and the righthand contacts of all switches on the right side of each pair from CH 10 to CH 76 are grounded at 17. Also note, that the righthand contacts of all switches on the right of each of the pairs from CH 2 to CH 9 are floating, that is to say, they are connected for open circuit. Note that for the pairs of switches for CH 2 to CH 9, the left hand contacts of the right switches of the pairs are series connected to the resistors 18 of the tens digits matrix 22 and to power source 14 through the switch arms when the switches are in the left position shown. In this situation the resistors 18 are connected to the power source 14 and therefore the anodes of tube 13 will be energized unless selectively de-energized through the diodes 23 as previously explained, or by the movement of the switches (CH 2 to CH 9) to the right. Note that all left hand contacts of the switches on the left of each of the pairs for CH 2 to CH 76 are open circuited, as is also true of the left hand contacts of the switches on the right side of each of the pairs for CH 10 to CH 76.

It will also be observed, that for the channels CH 2 to CH 9 the left arms of the left switches of each pair are connected to the digits matrix conductors 24, the connection being made to the appropriate units decimal digits numeral corresponding to the channel number. For the channels CH 10 to CH 13, the arms of the right switches of the pairs are connected to the tens digits matrix 22 conductor 24 corresponding to the numeral "1" since CH 10 to CH 13 have a "1" in the tens digits column. For the channels CH 26 to CH 76, the arms of the righthand switches are similarly connected to the tens matrix conductors 24 corresponding to the tens digits numbers of the channel numbers, and the arms of the left switches of the pair are connected to the units digits matrix conductors 24 corresponding to the units digits numbers of the channel numbers.

In operation, the actuation of any one of the pairs of switches from the left as shown in the drawing to the right will connect the appropriate ones of the anodes of the tubes 12 and 13 to ground through the diodes 23 and thus display the corresponding channel number. In the case of the channels CH 2 to CH 9 which have no tens digits, other than "0", it may be desireable that the "0" not appear. It is for that reason that the righthand switches of the pairs of switches for each of the channels CH 2 to CH 9 are arranged as shown. In other words, the actuation of any one of righthand switches to the righthand position will automatically open the circuit and disconnect the entire tens matrix 22 from the source of power 14 so that no numerals are displayed in the tens digit tube 13. If one wishes to include the "0" in the tens column for the channels CH 2 to CH 9, he may simply connect the resistors 18 of the tens matrix 22 directly to the power source 14 as done in the case of the units matrix, and then rearrange the righthand switches for channels CH 2 to CH 9 to de-energize the anode G of tube 13. Alternatively, he may rearrange the righthand switches for channels CH 2 to CH 9 to de-energize all anodes but G of tube 13 and thus display a dash ( - ).

Certain alternative arrangements for the switching array 20 are possible. The switches for the channels CH 2 to CH 9 may simply comprise the left hand switches of the pair and the function of the righthand switches may be performed in other ways, as by providing a third row of switches for the channels CH 10 to CH 76 which switches will connect the tens matrix 22 to the power source 14 whenever a particular one channels CH 10 to CH 76 is tuned. At the same time, the righthand switches shown for the channels CH 10 to CH 76 may be omitted and instead both the units and tens matrices may be operated solely by the switches shown in the left hand pairs for the channels CH 10 to CH 76.

It will be apparent that with the system thus far described, any six of the seventy UHF channels may assigned to the switches below CH 13 and the matrix connections rearranged to display them. The same is true for VHF channels CH 2 to CH 13, if desired, the system permits easy programming of channels to matrices for any particular local area requirements by simple switchboard or plugboard devices.

Referring now to FIG. 3, a slightly modified embodiment of the present invention is illustrated. For all practical purposes the tens digits matrix 22 and the units digits matrix 21, and their associated power supplies, are identical to those described above in connection with the embodiment of FIG.

2. The one exception is the terminals provided for conductors 24. It will be noted that each of the conductors 24 of the embodiment of FIG. 3 is provided with several terminals 30 to allow the connection of a plurality of conductors to each of conductors 24.

A switch array 31 is provided to control the energization of the display anodes of display tubes 12 and 13. Switch array 31 includes a plurality of pairs of switches, the total number of pairs depending upon the number of channels which the array is intended to accomodate. For purposes of simplicity, array 31 illustrated in FIG. 3 is shown as having only three pairs of switches. The first pair of switches includes switch elements 32 and 33, each having one contact connected directly to ground 17 and the other contact connected by means of conductors 34 to terminals 30 of matrix 21 and matrix 22. Conductors 34 are connected to switch elements 32 and 33 by means of connectors 35. As connected in FIG. 3, switch elements 32 and 33 are adapted to display numeral 65 when tuning mechanism 25 is adjusted such that the mechanical linkage 36 closes switch elements 32 and 33.

It will be appreciated that switch elements 37, 38, 39 and 40 can be interconnected by means of their respective connectors 35 to preselected terminals 30 of matrices 21 and 22 to display any desired two-digit number on display tubes 12 and 13. It should also be appreciated that any reasonable number of switch elements may be incorporated into switch array 31 and connected to appropriate terminals 30 of matrices 21 and 22 to accomodate any particular numbers utilized in any given area. The embodiment illustrated in FIG. 3, wherein multiple terminals are provided for each conductor 24, facilitates set up of the channel indicator means by a dealer or serviceman at the time a television receiver is delivered or moved from one reception area to another by simply reconnecting conductors 34 to the appropriate terminals 30. Tuning mechanisms 25, as illustrated in FIG. 3, may comprise a mechanically detented mechanism capable of being programmed to tune in those channels which are receivable within a given reception area. At the time the mechanism is programmed, the appropriate connections can be made between connectors 35 and terminals 30.

When connected as illustrated in FIG. 3, the arrangement displays the numeral "0" on display tube 13 when a one digit number is switched in by switch array 31. If it is desired to have display tube 13 be blank when a one-digit number is being displayed, power to matrix 22 can be circuited through switch array 31 in a fashion similar to that illustrated in the embodiment of FIG. 2.

Referring now to FIG. 4, an arrangement is illustrated including a switch array 41 wherein the two matrices 21 and 22 are controlled by a single switch element to display any given numeral. Switch elements 42 and 43 are interconnected with tuning mechanism 25 by means of mechanical linkage 44. Each of switch elements 42 and 43 have one contact directly connected to ground 17. The other contact is connected to a pair of connectors 35. To simplify the drawing, the interconnection of connectors 35 with matrices 21 and 22 is not illustrated; however it is to be understood that the connection is identical to that described above in connection with FIG. 3. A diode 45 is electrically connected between each of the connectors 35 and switch element 42 or 43 to isolate the matrices 21 and 22 from each other. As explained above with respect to the embodiment of FIG. 3, switch array 41 may include any reasonable number of switch elements depending upon the number of channels to be accommodated and the system can be pre-programmed in the same fashion as the arrangement of FIG. 3.

Referring now to FIG. 5, another embodiment of the present invention is illustrated and includes a switch array 46 which utilizes transistors 47 and 48 as switch means to interconnect preselected anodes of matrices 21 and 22 to ground 17. Tuning mechanism 25 is electrically connected to the base of each transistor so that an appropriate signal may be applied to the appropriate transistor in accordance with the condition of the tuning mechanism 25. With this arrangement, if tuning mechanism 25 is adjusted to a channel corresponding to the anodes controlled by transistor 47, a signal is applied to the base of transistor 47 to render transistor 47 conductive and thus connect those anodes to ground 17 in a manner similar to that discussed above in connection with the embodiments of FIGS. 3 and 4. Diodes are provided to isolate the matrices from each other and, as explained above, although only two channels are provided for in the drawing, any reasonable number of transistors may be provided depending upon the number of channels switch array 46 is intended to accommodate.

As will be evident from the foregoing description, certain aspects of the invention are not limited to the particular details of construction of the examples illustrated, and it is contemplated that various other modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. In a television receiver tunable to a plurality of channels, a channel indicator comprising:
- a units digits display device having a plurality of display elements in segmented configuration capable of displaying 10 units digits of channel numbers by selective energization of its display elements;
- a tens digits display device having a plurality of display elements in segmented configuration capable of displaying 10 tens digits of channel numbers by selective energization of its display elements;
- a units digits matrix for controlling the units digits display device to display said units digits;
- a tens digits matrix for controlling the tens digits display device to display said tens digits;
- a tuning mechanism for tuning said receiver to any one of said channels;
- and switch means actuated by said tuning mechanism for actuating said matrices for causing such display devices to display the channel number of the channel to which the receiver is tuned by said tuning mechanism.

2. A channel indicator as in claim 1 in which the switch means comprises:
- A switch array including:
- switches associated with channel numbers up to channel nine for actuating the units digits matrix;
- and switches associated with channels above channel nine for actuating both the units and tens digits matrices;

3. A channel indicator as in claim 2 in which the switch means includes:
- means for de-energizing the tens digits display device for channel numbers up to channel nine.

4. A channel indicator as in claim 2 in which said matrices are subtractive matrices including:
- means for energizing all of the display elements of the corresponding display devices;
- and second means responsive to said switch means for selectively de-energizing selected ones of the display elements so energized to display digits requiring less than all of said elements.

5. A channel indicator as in claim 4 in which the display elements are anode-cathode elements and in which the switch means comprises:
- a switch array including switches associated with the channel numbers for selectively short circuiting said anode-cathode elements.

6. A channel indicator as in claim 5 in which the switch means includes:
- means for de-energizing the tens digits display device for channel numbers up to channel nine.

7. In a television receiver tunable to VHF channels and a limited number of the 70 UHF channels, a channel indicator for both VHF and UHF channels readily programmable to a limited number of channels comprising:

a units display device having seven anode-cathode display elements in segmented figure "8" configuration capable of displaying 10 units digits of channel numbers by selective energization of its anode-cathode display elements;

a tens digits display device having seven anode-cathode display elements in segmented figure "8" configuration capable of displaying 10 tens digits of channel numbers by selective energization of its anode-cathode display elements;

means for energizing all of said anode-cathode elements;

a units digits matrix for selectively deenergizing anode-cathode elements of the units digits display device to display said units digits;

a tens digits matrix for selectively deenergizing anode-cathode elements of the tens digits display device to display said tens digits;

a tuning mechanism for tuning said receiver to any one of said channels;

and switch means actuated by said tuning mechanism for actuating said matrices for causing such display devices to display the channel number of the channel to which the receiver is tuned by said tuning mechanism.

8. A channel indicator as in claim 7 in which the switch means comprises:

a switch array including:

switches associated with VHF channel numbers up to channel nine for actuating the units digits matrix;

and switches associated with channels above VHF channel nine for actuating both the units and tens digits matrices.

9. A channel indicator as in claim 7 in which the switch means includes:

means for de-energizing the tens digits display device for channel numbers up to channel nine.

10. A channel indicator as in claim 7 in which the switch means comprises:

a switch array including switches associated with the channel numbers for selectively short circuiting said anode-cathode elements.

11. A channel indicator as in claim 1 further comprising:

terminal means to interconnect said switch means to said digits matrices;

said terminal means comprising a plurality of terminals connected to each of said display elements;

said switch means comprising a plurality of switch elements;

whereby said plurality of display elements may be selectively interconnected to said plurality of switch elements in varying combinations.

12. A channel indicator as in claim 11 wherein said switch elements are linked in pairs with one element of each pair being electrically connected to said units digits matrix and the other element of each pair being electrically connected to said tens digits matrix.

13. A channel indicator as in claim 11 wherein said switch element has one contact connected to both of said digits matrices and two diodes are provided, one between said units digits matrix and said contact and one between said tens digits matrix and said contact to isolate the matrices from each other.

14. A channel indicator as in claim 11 wherein said switch elements each comprise a transistor.

* * * * *